United States Patent [19]

Cannera et al.

[11] Patent Number: 5,195,795
[45] Date of Patent: Mar. 23, 1993

[54] AUTOMOTIVE VEHICLE SEAT ASSEMBLY FULLY RETRACTABLE BELOW THE VEHICLE'S FLOOR

[76] Inventors: Raymond C. Cannera, 4767 Ennismore Dr., Drayton Plains, Mich. 48346; Douglas J. Stafford, 1410 3 Mile Dr., Grosse Pointe Park, Mich. 48230

[21] Appl. No.: 861,702
[22] Filed: Apr. 1, 1992
[51] Int. Cl.⁵ .............................................. B60N 3/04
[52] U.S. Cl. ...................................... 296/65.1; 296/66; 297/331
[58] Field of Search ................. 296/65.1, 66; 297/331, 297/334, 335

[56] References Cited

U.S. PATENT DOCUMENTS

| 1,158,223 | 10/1915 | Huschle, Jr. ............................ 296/66 |
| 1,649,608 | 11/1927 | Matthews ............................ 294/65.1 |
| 3,227,488 | 1/1966 | Kosbab et al. ................... 296/65.1 X |
| 4,519,646 | 5/1985 | Leitermann et al. ........... 296/65.1 X |
| 4,699,418 | 10/1987 | Plavetich ............................ 296/65.1 |
| 4,848,826 | 7/1989 | Kuwabara et al. ............. 296/65.1 X |
| 4,932,709 | 6/1990 | Wainwright ........................ 296/65.1 |
| 4,979,772 | 12/1990 | Carey et al. ....................... 296/66 X |

FOREIGN PATENT DOCUMENTS 628078 8/1949 United Kingdom ................. 296/66

Primary Examiner—Charles A. Marmor
Assistant Examiner—Joseph D. Pape
Attorney, Agent, or Firm—Mark P. Calcaterra

[57] ABSTRACT

The invention relates to a storable vehicle seat assembly which is fully retractable below the level of the vehicle's floor. Typically, the invention involves a bench-type seat which is located behind the driver and passenger seats of a van or station wagon. In an operative position, the seat has an upper member or back rest which cooperates with a lower horizontal bench member to provide the seating portion. In the nonoperative or fully retracted position, the upper seat portion is folded upon the lower seat member and the supporting legs so that the entire seat assembly occurs below the level of the vehicle's floor.

15 Claims, 2 Drawing Sheets

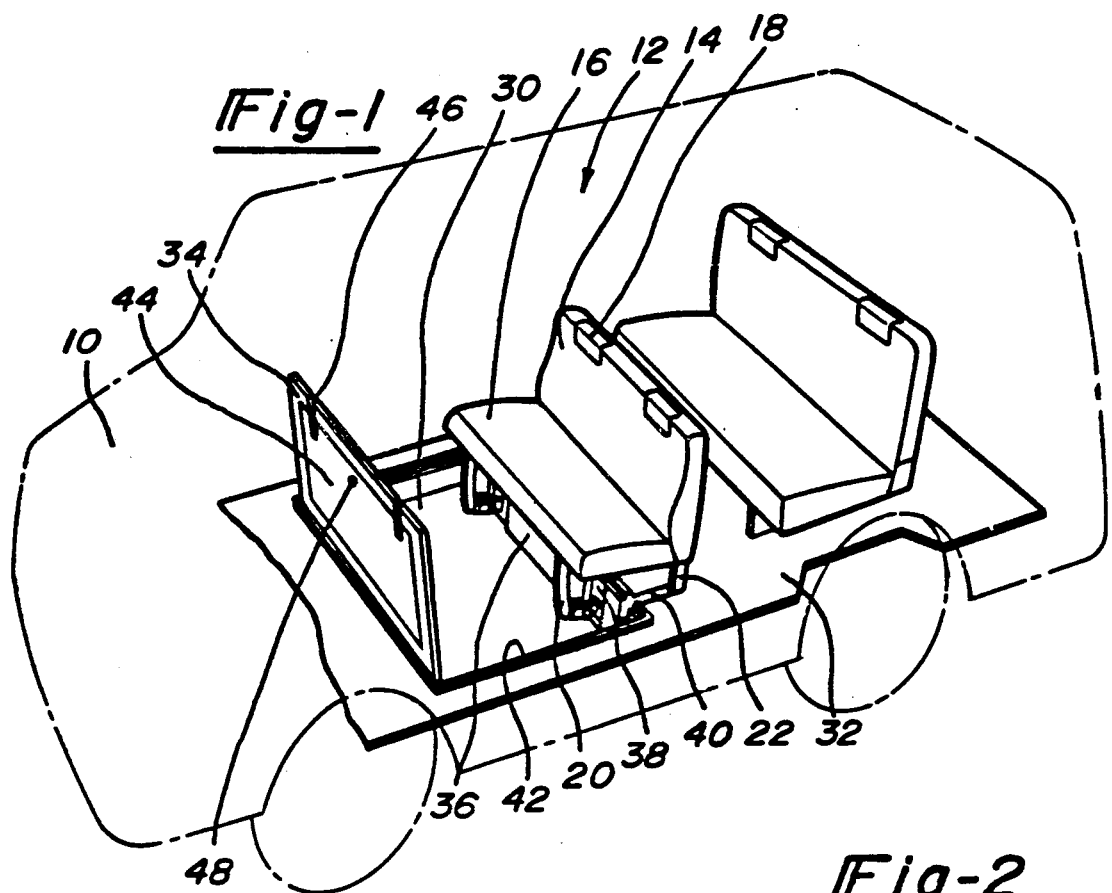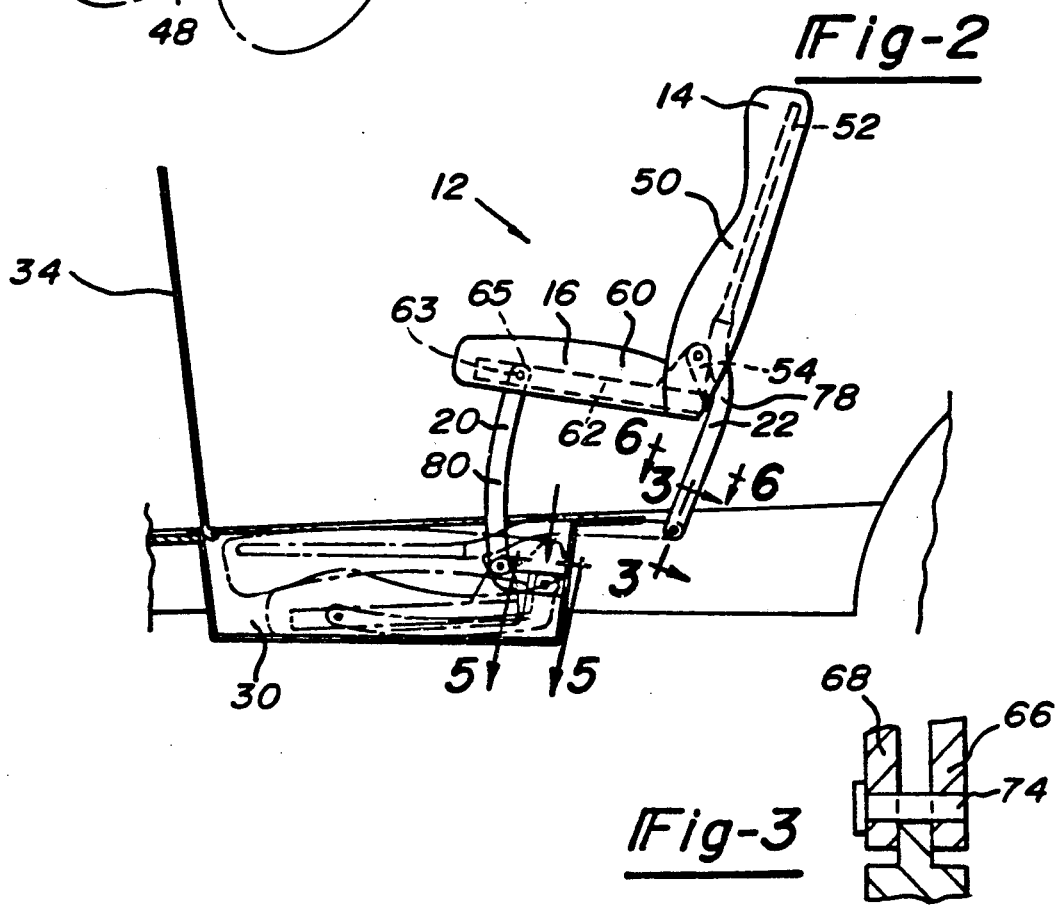

AUTOMOTIVE VEHICLE SEAT ASSEMBLY FULLY RETRACTABLE BELOW THE VEHICLE'S FLOOR

BACKGROUND OF THE INVENTION

1. Technical Field

This invention relates to automotive vehicle seats and, more particularly, to rear seats for vans or station wagons which are stored below the surface of the vehicle's floor. The invention also relates to a method of adjusting this seat from an operative to an inoperative position.

2. Discussion

Automotive vehicles, such as vans, station wagons and recreation vehicles, are purchased often times for their carrying capacity. This carrying capacity includes both the transportation of passengers and the transportation of various sizes and amounts of cargo. For this reason, many of these vehicles are provided with one or more retractable seats which enable increased storage capacity when there is a limited number of passengers.

A major drawback with many of the retractable seats presently available is that the separate manipulation of multiple parts is often required in order to achieve full retraction of the vehicle seat. For example, the seat portion must first be displaced by folding the seat cushions or completely removing them. Secondly, some manipulation of the backrest is then required by folding, rearranging or completing removing the backrest. Lastly, the bracket or leg members must then be displaced below the level of the floor.

Prior art has shown retractable vehicle seat members which fold into a seat storage compartment. One such example is U.S. Pat. No. 3,202,453. This patent illustrates a seat assembly which may be stored within a storage compartment. The seat is designed to fold rearward into the storage compartment. However, this rearward folding tends to require extensive manipulation.

SUMMARY OF THE INVENTION

The present invention provides the art with a fully retractable vehicle seat which is easily manipulated from an operative to an inoperative position. The present invention provides the art with an easily installed fully retractable seat assembly. A storage area is provided which can be utilized to store other objects when the seat assembly is in an operative position.

The present invention, therefore, relates to a fully retractable seat assembly which may be stored completely below the level of the vehicle's floor. To manipulate the seat assembly from an inoperative position, within the seat storage area, to an operative position the user need only grasp the top of the backrest portion and pull upward. This, in turn, enables the forward and rearward leg members to extend and rotate upward, to bring the lower seat portion into a horizontal position and the backrest seat portion to a relatively vertical position. Once the seat assembly is in the fully operative position both the forward and rearward legs lock in place to maintain the seat assembly in this operative position.

With the legs in their locked position, a door hingedly attached to vehicle's floor is lowered from a vertical position to a horizontal position in the direction of the seat assembly. This door contains another door thereon which opens to provide access within the storage area to store other objects.

To return the seat assembly to an inoperative position, fully contained within the storage area the user raises the door contained on the vehicle's floor to uncover the seat storage area. The forward and rearward legs are unlocked. The backrest seat portion is moved forward causing the entire seat assembly to rotate downward until it is entirely contained within the storage compartment below the vehicle's floor. Lastly, the storage compartment door is rotated downward to conceal the seat assembly.

Additional benefits and advantages of the present invention will become apparent to those skilled in the art to which this invention relates from a reading of the subsequent description of the preferred embodiments and the appended claims, taken in conjunction with the accompanying drawings.

BRIEF DESCRIPTION OF THE DRAWINGS

FIG. 1 is a perspective view of a storable seat assembly within a phantom vehicle in an operative position in accordance with the present invention.

FIG. 2 is a side elevation view of the seat assembly of FIG. 1 in a raised position.

FIG. 3 is a cross sectional view of FIG. 2 along line 3—3 thereof.

DETAILED DESCRIPTION OF THE PRFFERRED EMBODIMENT

Figure 4:
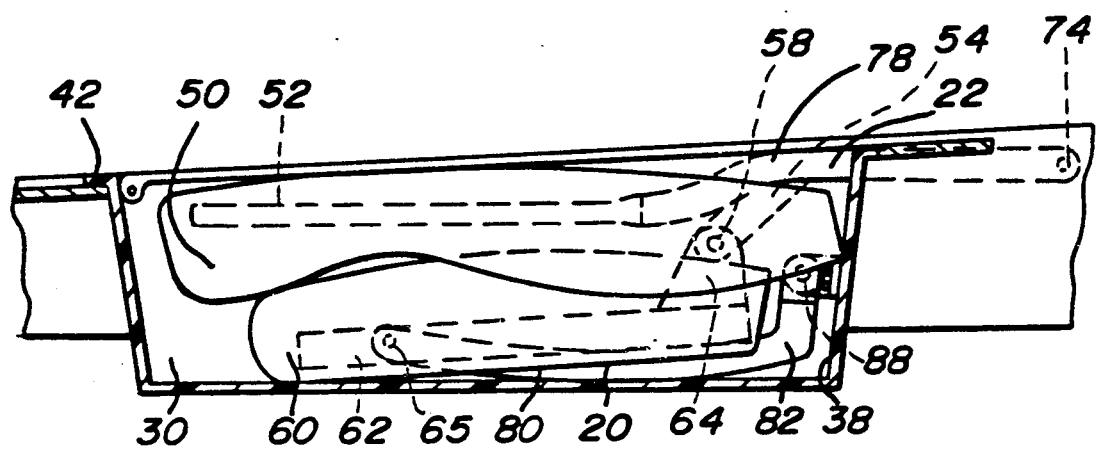
FIG. 4 is a side elevation view of the seat assembly in a lowered position.

Referring to FIG. 1, a perspective view of an automotive vehicle 10 is shown in phantom with a storable seat assembly 12 in accordance with the present invention. The seat assembly 12 includes an upper backrest seat member 14 and a lower horizontal seat member 16. The upper backrest seat member 14 may have built-in extendable head rests 18 which may be extended when the seat assembly 12 is in the operative position and may be fully retracted into the upper seat member 14 when the seat assembly 12 is in an inoperative position. Pivotal legs 20 and 22 extend from the seat members 14 and 16 to enable movement from the operative to inoperative position.

A storage compartment 30 houses the seat assembly 12 when the seat assembly 12 is in an inoperative folded position as seen in FIGS. 2 and 4. The storage compartment 30 is integral with and position below the vehicle's floor 32. A door 34 is hingedly attached to the vehicle's floor 32 at the leading end of the storage compartment 30 to enable covering of the seat assembly 12 while it is in an inoperative position. The storage compartment 30 has an overall rectangular shape which is slightly larger in area than the upper backrest seat member 14. The back wall 36 of the storage compartment 30 includes recessed areas 38 to enable attachment of legs 20. Grooves 40 enable storaging retraction of legs 22. A shelf 42 surrounds the periphery of the storage container 30 to seat the door 34 so as to be flush with the vehicle floor 32 in a closed position.

The door 34 includes an additional door 44, and slots 46. The slots 46 are provided on the leading edge of doors 34 and 44 to enable the doors 34 and 44 to pass by the forward leg members 20 while the seat is in an operative position.

The door 44 provides access into the storage compartment 30 while the door 34 is in a closed position by rotating the door upward. This second door 44 also includes a locking latching mechanism 48 to provide limited access within the storage compartment.

Turning to FIGS. 2 and 4, the upper backrest seat member 14 includes a cushion 50 and a relatively rectangular support frame 52. The cushion is made of a foam material and the frame of a metal such as aluminum or an aluminum alloy. The support frame 52 is permanently fixed to the rear legs 22 by welding or the like. A pair of projecting nubs 54 extend from the junction of the legs 22 and support frame 52 to provide securement for pivot pins 58. Pivot pins 58 enable pivoting of the lower horizontal seat member 16 with respect to the upper backrest seat member 14 when the seat 12 is rotated from an operative to an inoperative position.

Figure 6:
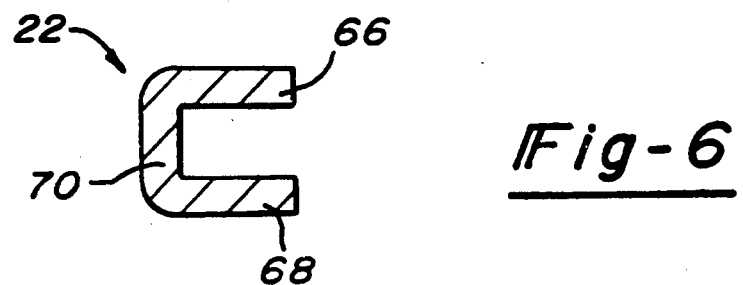
FIG. 6 is a cross sectional view of the rearward legs of FIG. 2 along line 6—6 thereof.

The rear legs 22 have an overall U-shape in cross section, as seen in FIG. 6, with a pair of legs 66 and 68 connected by a web 70. The legs 22 at one end include apertures 72 to enable passage of a pivot pin 74 to secure the legs 22 to the vehicle floor 32 as seen in FIG. 3. The legs 22 are secured below the surface of the vehicle floor 32 in a channel 40. The channel 40 houses the legs 22 to be substantially flush with the surface of the vehicle floor 32 when the seat 12 is in its stored position. The other end of the legs 22 have an arcuate portion 78 to provide dimensional characteristics to enable the seat to be stored within the storage compartment 30. Also the nubs 54 extend from the legs 22 adjacent the arcuate portions 78.

Likewise, the lower horizontal seat member 16 includes a foam cushion 60 and a rectangular frame 62. The rectangular frame 62 has a pair of extending ears 64 on each side at the junction of the lower and upper seat members. The ears 64 include apertures to enable passage of pivot pins 58 to connect the upper and lower seat members with one another. The frame 62 includes a mounting bore 63 to enable pivotal connection of the legs 20 with the frame 62 pivot via pins 65. The frame 62 also incorporates a grid attached thereto via a plurality of springs (not shown) to provide support for the passenger.

Figure 5:
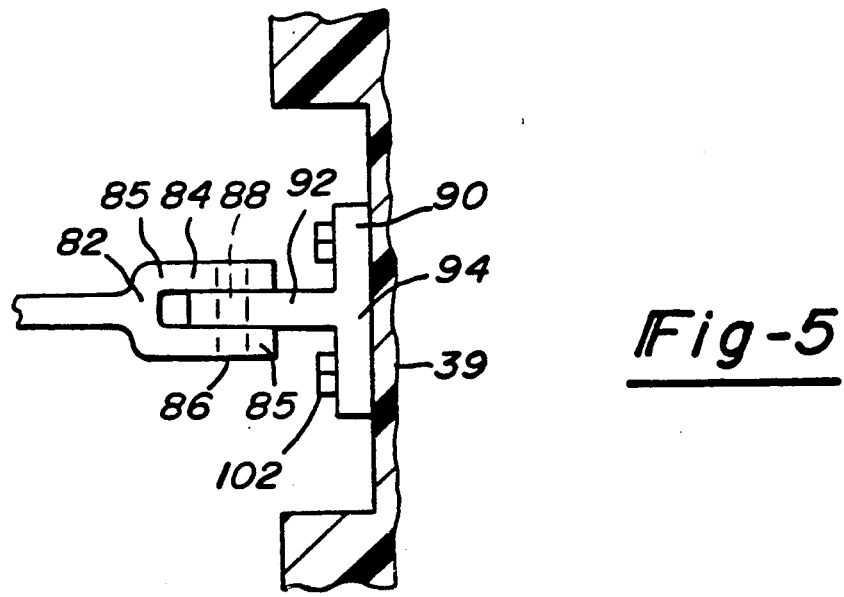
FIG. 5 is a cross sectional view of the forward legs of FIG. 2 along line 5—5 thereof.

Forward legs 20 include an upper slightly arcuate portion 80 which appears in a vertical position when the seat assembly is in an operative position and a lower horizontal portion 82. The forward legs 20 have an overall L-shape with the upper leg 80 curved from end to end. The upper leg portion 80 of forward legs 20 are secured to the frame 62. As demonstrated in FIG. 5, the lower leg portions 82 include having U-shaped ends referred to herein as yokes 84 to secure forward leg 20 to bar 92. The yoke 84 has a pair of fingers 85 with apertures 86 therethrough to enable pivot pin 88 to pivotally secure the lower leg 82 to bar 92. Bars 92 are planar members with an aperture 86 at the end thereof. Apertures 86 enable pins 88 to pass therethrough. Mounting brackets 90 are secured to the storage compartment back wall in recessed areas 38. The mounting brackets 90 include a parallel wall 94 and a projecting bar 92. Parallel wall 94 has a pair of apertures through which connecting pin 102 pass through into recessed area back wall 39.

The legs 20 and 22 are locked in position by their geometry which enables the downward force of the upper and lower seat members to be greater than the force required to displace the seat to its storage position.

To provide additional storage space in the rear compartment of the automotive vehicle 10 the seat assembly 12 can be retracted from its operative position to an inoperative position and stored within the seat storage compartment 30, as shown in phantom by FIG. 2 and by FIG. 4. To retract and store the seat assembly 12 both the forward 20 and rearward 22 legs must first be unlocked. After unlocking, the entire seat assembly 12 is rotated forward. To initiate this forward rotation, force is applied to the upper backrest seat member 14 either by pulling on it from in front of the seat or by pushing on it from behind the seat. The force causes the upper backrest seat member 14 to move forward as rearward legs 22 pivot about the pins 74. As this pivoting occurs, the rearward legs 22 approach the storage compartment 30 within channels 40. Immediately after pivoting at pins 74, pivoting occurs at the pivots 58 where ears 64 connect to the nubs 54.

Simultaneously, the lower seat member 16 advances forward. As the lower seat 16 begins to move toward the storage compartment 30, pivoting occurs along the lower seat member at pivot pins 65. Additionally, pivoting occurs at the yokes 84 and mounting brackets 90 via pivot pins 88. During this forward movement of the lower seat member 16, the ears 64 rotate away from the upper backrest seat member 14 to provide the space necessary for both the upper and lower seat members 14 and 16 to be in a stacked relationship adjacent one another within the storage compartment.

Once the seat assembly 12 has been rotated forward and downward to the point where it is completely below the level of the floor 32, the door 34 may again be closed to conceal the seat assembly 12.

While the above-detailed description describes the preferred embodiment of the present invention, it will be understood that the present invention is susceptible to modification, variation and alteration without deviating from the scope of the subjoined claims.

What is claimed is:

1. A storable vehicle seat assembly wherein the vehicle seat is fully retractable below floor level of the vehicle, comprising:

storage means for storage of a seat assembly, said storage means positioned within the vehicle below floor level;

at least one channel within said vehicle floor, said at least one channel extending rearwardly from said storage means;

a seat assembly having an upper seat member coupled with a lower seat member;

at least one rotatable forward leg member pivotally attached at one end to said lower seat member and at a second end to said storage means;

at least one rotatable rearward leg member pivotally attached at one end to said upper seat member and at a second end to said vehicle floor, within said channel; and cover means for covering said storage means when said seat member is in an operative and inoperative position, said cover means being substantially flush with said floor when covering said storage means.

2. The storable vehicle seat assembly according toi claim 1 wherein said cover means includes a partially rotatable first door hingedly attached to said vehicle floor.

3. The storable vehicle seat assembly according to claim 2 wherein said first door includes a second hingedly attached door wherein said second door provides access to said storage means when said first door is substantially flush with said floor.

4. The storable vehicle seat assembly according to claim 3 wherein said second door includes locking means to prevent undesired access to said storage means.

5. The storable vehicle seat assembly according to claim 1 wherein said storage means includes a recessed shelf which hosts said covering means when said covering means covers said storage means.

6. The storable vehicle seat assembly according to claim 1 wherein said upper seat member includes at least one headrest.

7. The storable vehicle seat assembly according to claim 6 wherein said head rest is fully retractable into said upper seat member such that said head rest is substantially flush with said upper seat member.

8. The storage vehicle seat assembly according to claim 1 wherein said rotatable forward leg member has an overall L-shape.

9. The storable vehicle seat assembly according to claim 8 wherein said rotatable forward leg member has an overall U-shape in cross-section.

10. The storable vehicle seat assembly according to claim 1 wherein said rotatable rearward leg member has an overall U-shape in cross-section.

11. The storable vehicle seat assembly according to claim 1 wherein said at least one forward leg member is pivotally attached to said vehicle floor by an extending bar mounted to said floor with said storage means.

12. The storable vehicle seat assembly according to claim 1 wherein said at least one rearward leg member is pivotally attached to said floor within said at least one channel.

13. The storable vehicle seat assembly according to claim 1 wherein said downward force exerted upon said upper and lower seat members when said seat assembly is in an operative position locks said forward and rearward legs in the operative position.

14. A method of adjusting a storable vehicle seat assembly from an operative to an inoperative position below the level of the vehicle's floor, said storable vehicle seat assembly having an upper seat member and a lower seat member secured in an operative position by one or more forward and rearward leg members, storage means for storage of the seat assembly located in the vehicle below floor level, and cover means for covering said storage means, said method including:
 displacing said cover means to an open position to reveal said storage means;
 displacing said upper and lower seat members and rotating said upper seat member forward;
 folding said upper seat member upon said lower seat member by further forward rotation of said upper seat member, wherein said forward and rearward leg members simultaneously rotate downward; and
 positioning said upper and lower seat members and said at least one forward and rearward leg members in a substantially horizontal position within said storage means such that said storable vehicle seat assembly has been fully retractable below said vehicle floor.

15. The method according to claim 14 further including rotating said cover means from an open vertical position to a closed horizontal position wherein said cover means conceals said vehicle seat assembly.

* * * * *

UNITED STATES PATENT AND TRADEMARK OFFICE
CERTIFICATE OF CORRECTION

PATENT NO. : 5,195,795

DATED : March 23, 1993

INVENTOR(S) : Raymond C. Cannera, et al

It is certified that error appears in the above-identified patent and that said Letters Patent is hereby corrected as shown below:

On the title page, Item [73]
                insert --Chrysler Corporation--

Signed and Sealed this

Twenty-sixth Day of July, 1994

*Attest:*

BRUCE LEHMAN

*Attesting Officer*      *Commissioner of Patents and Trademarks*